United States Patent [19]

Nishimura et al.

[11] Patent Number: 5,416,317
[45] Date of Patent: May 16, 1995

[54] VISUAL LINE DETECTING DEVICE

[75] Inventors: Hitoshi Nishimura, Komae; Toshimi Watanabe, Machida, both of Japan

[73] Assignee: Nikon Corporation, Tokyo, Japan

[21] Appl. No.: 188,790

[22] Filed: Jan. 31, 1994

[30] Foreign Application Priority Data

Feb. 6, 1993 [JP] Japan .................................. 5-041957

[51] Int. Cl.⁶ ....................... G03B 13/02; G02B 27/02
[52] U.S. Cl. ..................... 250/221; 351/210; 354/62; 354/219
[58] Field of Search ........ 250/221, 216, 201.2, 250/201.4, 201.6, 201.7, 201.8, 561; 351/210; 354/62, 219, 400, 402, 403, 404

[56] References Cited

U.S. PATENT DOCUMENTS

| | | | |
|---|---|---|---|
| 4,574,314 | 3/1986 | Weinblatt | 354/400 X |
| 4,836,670 | 6/1989 | Hutchinson | 351/210 |
| 5,036,347 | 7/1991 | Tsunekawa et al. | 354/400 |
| 5,182,443 | 1/1993 | Suda et al. | 250/201.2 |
| 5,335,035 | 8/1994 | Maeda | 354/219 |

FOREIGN PATENT DOCUMENTS

| | | |
|---|---|---|
| 1-185241 | 7/1989 | Japan . |
| 2-5 | 1/1990 | Japan . |
| 2-206425 | 8/1990 | Japan . |

*Primary Examiner*—David C. Nelms
*Assistant Examiner*—John R. Lee

[57] ABSTRACT

A visual line detecting device having an eyeball lighting unit that irradiates the eyeball of a viewer with a luminous flux, and a visual line detecting unit that detects the visual line of a viewer from the reflected image on the cornea surface of the eyeball, wherein the eyeball lighting unit is designed so that the reflected image on the cornea surface attains a specified shape.

23 Claims, 12 Drawing Sheets

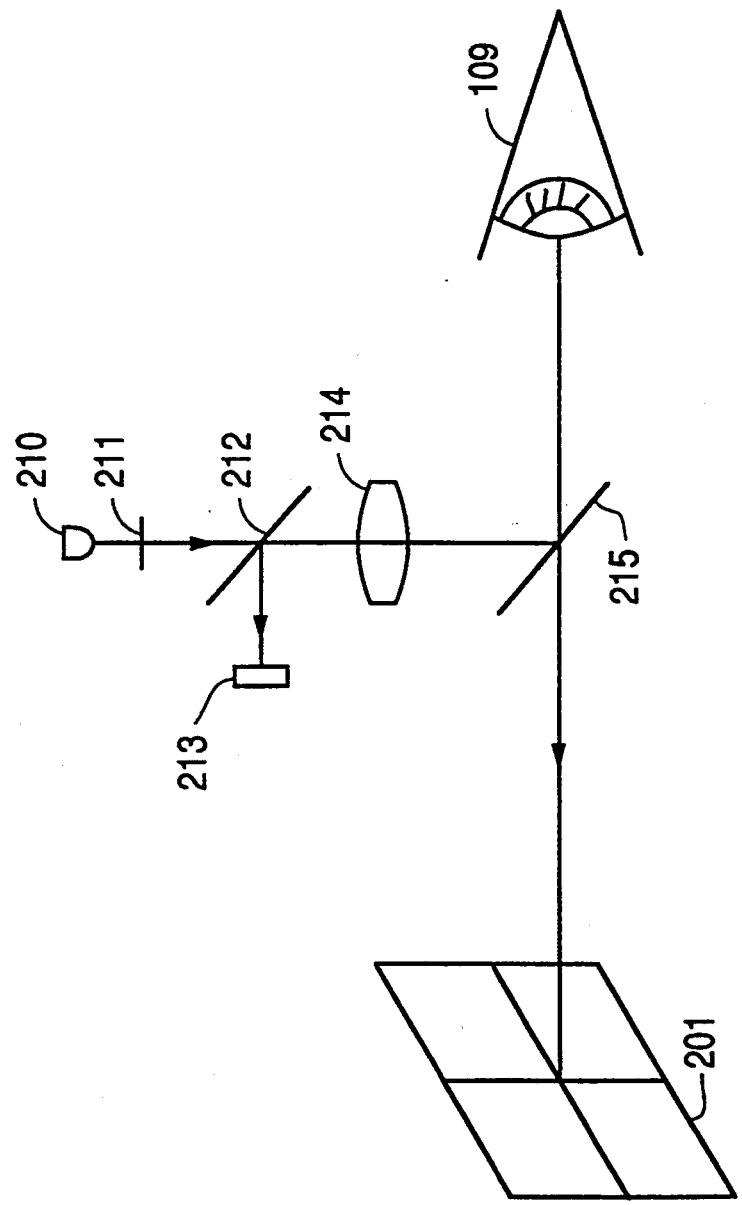

VISUAL LINE DETECTING DEVICE

BACKGROUND OF THE INVENTION

1. Field of the Invention

The present invention relates to a visual line detecting device and, more particularly, to a visual line detecting device which detects the direction of the visual line of a viewer's eyeball from the location of a Purkinje's first figure and the position of the center of the pupil.

2. Description of the Related Art

Conventional visual line detecting devices, such as the device disclosed in Japanese Patent Publication No. 61-172552, typically utilize a luminous point source to light the eyeball wherein light is reflected on the cornea surface to form a virtual image. The position of the center of the pupil is detected from the boundary between the pupil area and the iris area based on the differences between the reflectance of the pupil area and the iris area. An eyeball's rotational angle can then be determined based on relative movement between the reflected virtual image and the position of the center of the pupil.

A conventional visual line detecting device is illustrated in FIG. 13. A reflected image 141 from a point source (not illustrated) is reflected on the cornea surface of eye 140. From the use of image forming lens 142, eye image 144 of eye 140 and point source image 145 of a reflected image 141 are projected on the surface of an optically composed virtual light receiving element 143.

Although a virtual image of reflected light on the cornea surface moves both vertically and horizontally in accordance with the movement of the eyeball, only a small dot-like image (as compared to the total amount of light luminated) is formed on light receiving element 143. For example, see "dot-like" point source image 145.

As illustrated in FIG. 13, point source image 145 reflected from the cornea surface is often formed away from light receiving element 143. Therefore, the detection of images reflected from the cornea surface by light receiving element 143 is sometimes prohibited.

Additionally, as the position of the center of the pupil is obtained by detecting the boundary between the pupil area and the iris area based on differences between the reflectance of the pupil area and the iris area, a conventional visual line detecting device must catch slight differences of reflectance between the pupil area and the iris area, thereby requiring a multiple division photographic element with a large number of pixels for use as light receiving element 143. This can increase system cost and processing time.

If a second dimension photographic element is used as a multiple division light receiving element with a large number of pixels, a problem arises in which the processing speed slows down in proportion to the number of pixels, thereby increasing the requirement for a larger memory.

On the other hand, if a first dimension light receiving element is used, the processing speed is fast and the memory requirement is smaller; however, as discussed above for FIG. 13, there is a problem in that the reflected image on the cornea surface often forms away from the first dimension photographic element.

SUMMARY OF THE INVENTION

Accordingly, it is an object of the present invention to provide an accurate visual line detection device utilizing a light receiving element without decreasing either the processing speed or the detection precision.

It is an object of the present invention to provide a visual line detecting device which irradiates the eyeball with a luminous flux forming a specific shape, such as a cross, circular ring, rectangle, or linear "bar."

It is a further object of the present invention to detect a visual line by analyzing an image reflected off the cornea surface formed by irradiating the eye with a specifically-shaped luminous flux.

It is yet a further object of the present invention to provide a visual line detecting device which uses only one light receiving element in consideration of the reduced light volume due to a division of the optical path among a plurality of light receiving elements and the complexity of the apparatus. In the previously described visual line detecting device of Japanese Patent Publication No. 61-172552, the reflected image on the cornea and the boundary between the pupil area and iris area were detected using separate light receiving elements.

Additional objects and advantages of the present invention will be set forth in part in the description which follows, and, in part, will be obvious from the description, or may be learned by practice of the invention.

The foregoing objects of the present invention are achieved by providing a visual line detecting device comprising an eyeball lighting unit that lights an eyeball of a viewer with a luminous flux to produce a specific, non-dot shape image reflected on the cornea surface of the eyeball, an image detecting unit that detects the image, and a visual line detection unit that determines the visual line of a viewer from the image.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 16 is a side view that shows a third embodiment of the visual line detecting device of the present invention.

DESCRIPTION OF THE PREFERRED EMBODIMENTS

Figure 1:
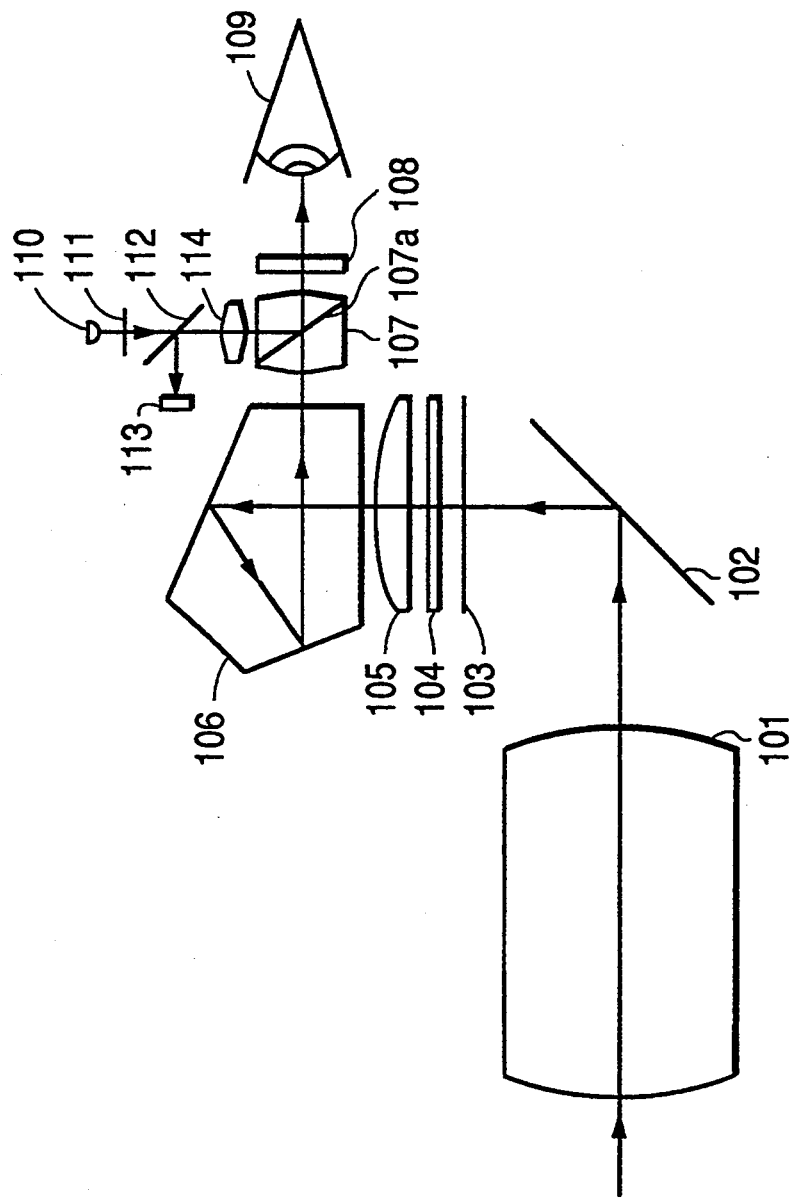
FIG. 1 is a side view of a first embodiment of the visual line detecting device of the present invention.

Reference will now be made in detail to the present preferred embodiments of the present invention, examples of which are illustrated in the accompanying drawings, wherein like reference numerals refer to like elements throughout.

FIG. 1 is a side view of the first embodiment of the visual line detection device of the present invention. In FIG. 1, photographic lens 101 represents a photographic lens in a camera (not illustrated). Photographic lens 101 is illustrated as one lens; however, a typical camera photographic lens is actually a lens system comprising a plurality of lenses. Quick return mirror 102, display device 103, focusing screen 104, condenser lens 105, and pentagonal prism 106 are also illustrated.

These elements represent well-known elements as a configuration of an optical member of a single-lens reflex (SLR) camera which does not include a visual line detecting device of the present invention. Other elements of such camera optical systems include: an AF module (not illustrated), photometry element (not illustrated), shutter screen (not illustrated), etc. These additional elements will not be further described since they are not directly associated with the present invention and are well-known in the art.

A configuration of a visual line detecting device as part of an optical system is described below and further illustrated in FIG. 1. Eye piece 107 is illustrated as a single lens, however, it may be comprised by a plurality of lenses. Eye piece 107 acts as a light dividing device and reflects infrared range light. Eye piece 107 includes dichroic mirror 107a that allows visible light to penetrate. Eye piece 108 is without magnification and acts to prevent dust and moisture from entering the system through the eye piece part.

Figure 2:
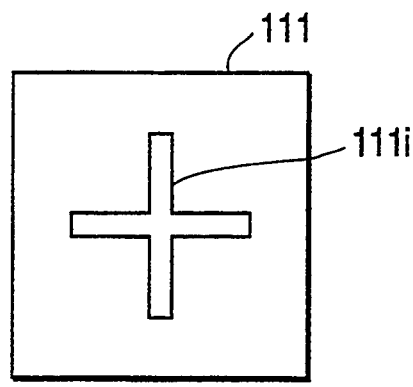
FIG. 2 is a front view that shows the shape of a mask in the first embodiment of the present invention.

The viewer's eye 109 represents the eyeball of a photographer. A photographer observes an object passing through photographic lens 101 to eye piece 108. Visual line detecting light source 110 is used to luminate eye 109. For installation in a camera, visual line detecting light source 110 is preferably a light source with an invisible wavelength range, such as the range transmitted by an infrared emitting diode. Mask 111 is used to form the flux of visual line detecting light source 110 into an intended shape. In a preferred embodiment, the intended shape is cross-shaped, therefore, mask 111 has a cross-shaped opening 111i, as shown in FIG. 2. Half mirror 112 is placed in position to guide an image of viewer's eye 109 (eye 109 is lighted by visual line detecting light source 110) onto photoelectric conversion element 113.

Figure 3:
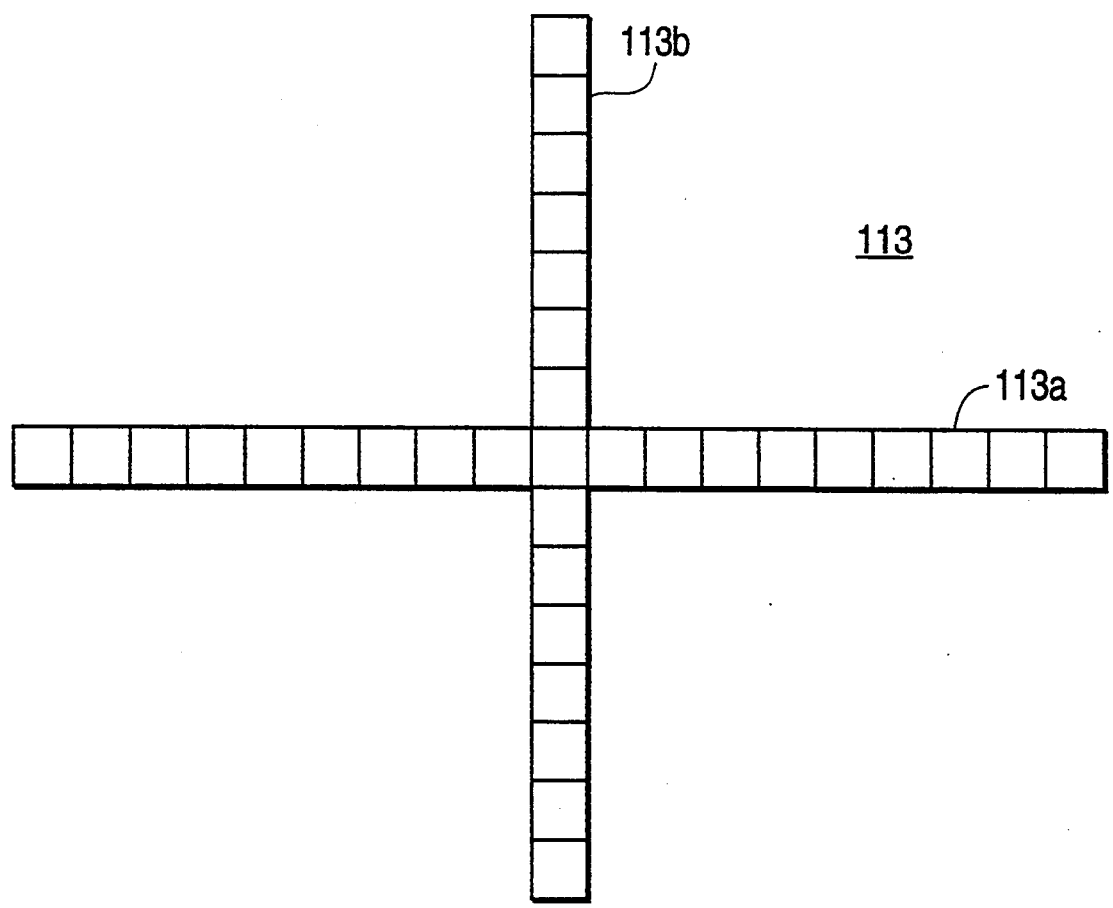
FIG. 3 is a front view that shows the shape of a light receiving element in the first embodiment of the present invention.

As shown in FIG. 3, photoelectric conversion element 113 is an element wherein two CCD line sensors 113a and 113b are placed in a configuration perpendicular to each other to form a cross shape, as illustrated in FIG. 3.

Lens 114 is a lens system comprised of one lens or a multiple of lenses. Lens 114 is used as an irradiating optical system that irradiates viewer's eye 109 from a sufficiently distant point with luminous flux emitted from visual line detecting light source 110 by utilizing a curvature of the eyeball side surface of lens 114 and eye piece 107. Additionally, lens 114 also functions as an image forming lens that forms an image on CCD line sensor 113. Focal points (not illustrated), when mask 111 and the cornea surface of eye 109 are regarded as lenses, are located in roughly conjugated positions. Furthermore, if the cornea surface of eye 109 is regarded as a lens, the resulting focal point would be located in roughly a conjugated position with CCD line sensor 113.

Figure 4:
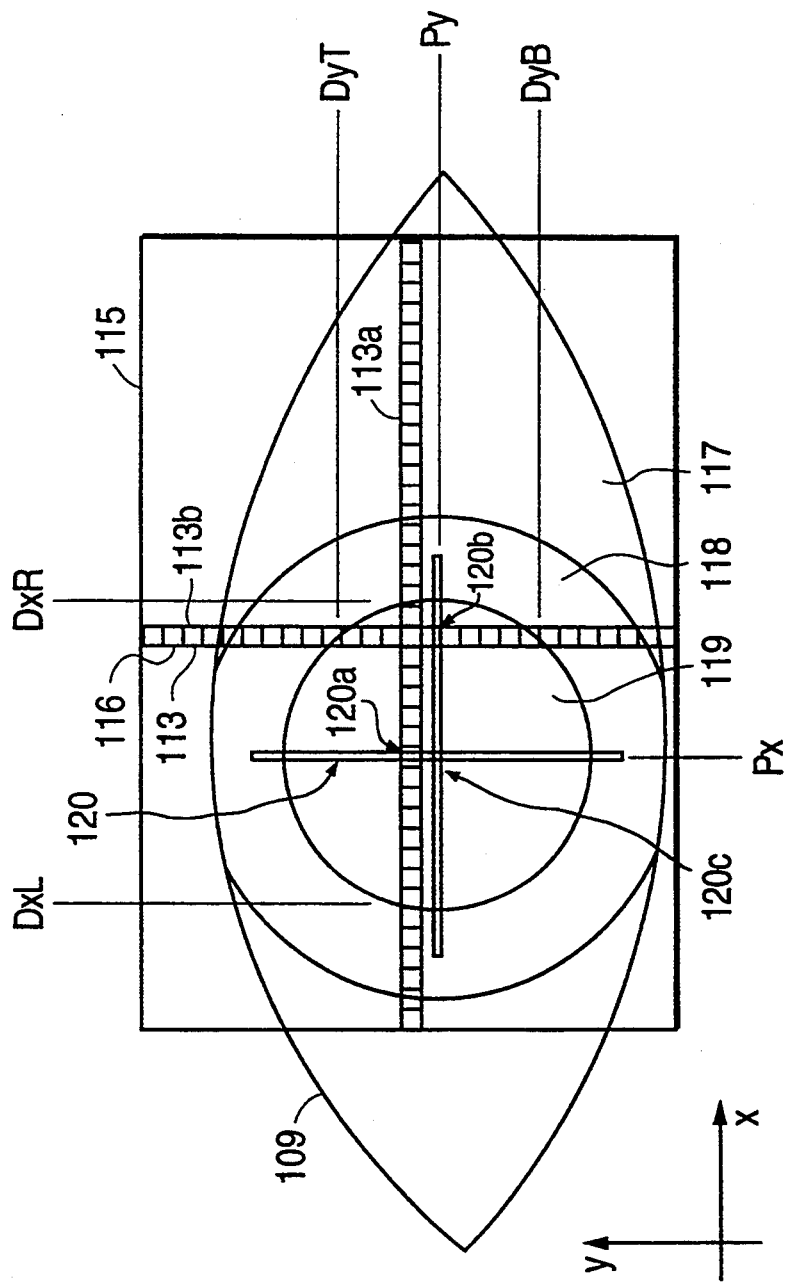
FIG. 4 is a front view that shows the state of detection in the first embodiment of the present invention.

FIG. 4 is a front view that shows the state of eye 109 when viewed through a view finder of a camera. The X-axis is set in a horizontal direction of FIG. 4 and the Y-axis is set perpendicular to the X-axis. The X-axis and the Y-axis may be set in a random direction, provided that both axes cross at right angles. The X-axis may match the horizon.

Eye 109 is shown looking through a camera view finder, represented by view finder field frame 115. Element arrays 113a and 113b of CCD line sensor 113, arranged in a crossed position and placed in the same direction as with the X-axis and Y-axis, respectively, are shown overlapping with view finder field frame 115. Range 116 is measured by CCD line sensors 113.

In FIG. 4, eye 109 is further illustrated by sclera part 117, iris part 118 and pupil part 119. Virtual image 120 (hereafter referred to as "Purkinje's first figure") represents a reflected image from light reflected onto the cornea surface of eye 109 by irradiation from visual line detecting light source 110.

As the viewer's eye 109 is irradiated with a cross-shaped light source using mask 111, Purkinje's first figure 120 is formed in a cross-shape that is an identical shape to opening 111i of mask 111. Dot 120a represents a point where Purkinje's first figure 120 is detected by an element array 113a in the horizontal direction, wherein dot 120a is detected as coordinate Px on the X-axis in FIG. 4. Dot 120b represents a point where Purkinje's first figure 120 is detected by the element array 113b in the vertical direction, wherein dot 120b is detected as coordinate Py on the Y-axis in this FIG. 4. Center point 120c represents the intersection of two bar-shaped images forming the cross shape of Purkinje's first figure 120. The coordinates of center point 120c of the cross shaped Purkinje's first figure 120 are (Px, Py) on the predetermined x-y plane.

Generally, when a light source is sufficiently distant, center point 120c of a cross-shaped Purkinje's first figure 120 corresponds with the location of a dot-like Purkinje's first figure formed by a point source that has been placed in the center point where two bar-shaped openings intersect to form a cross on mask 111.

Consequently, center point 120c of cross-shaped Purkinje's first figure 120 is determined by detecting the intersection of the bar-shaped portion of cross-configured Purkinje's first FIG. 120 which extends in the Y-axis direction with element array 113a in the X-axis direction and detecting the intersection of the bar-shaped portion of cross-configured Purkinje's first FIG. 120 which extends in the X-axis direction with the element array 113b in the Y-axis direction. More specifically, cross-shaped Purkinje's first figure 120 is formed on CCD line sensor 113 arranged in a cross-configuration wherein points 120a and 120b are detected by element arrays 113a and 113b of CCD line sensor 113. This method enables the detection of center point 120c of a cross of Purkinje's first figure 120. Since center point 120c is identical to the location of Purkinje's first figure by a point source that has been placed in the center point 120c where two bar-shaped openings intersect to form a cross on mask 111, the direction of a visual line may be detected by using center point 120c of a cross-shaped Purkinje's first figure 120.

Figure 14:
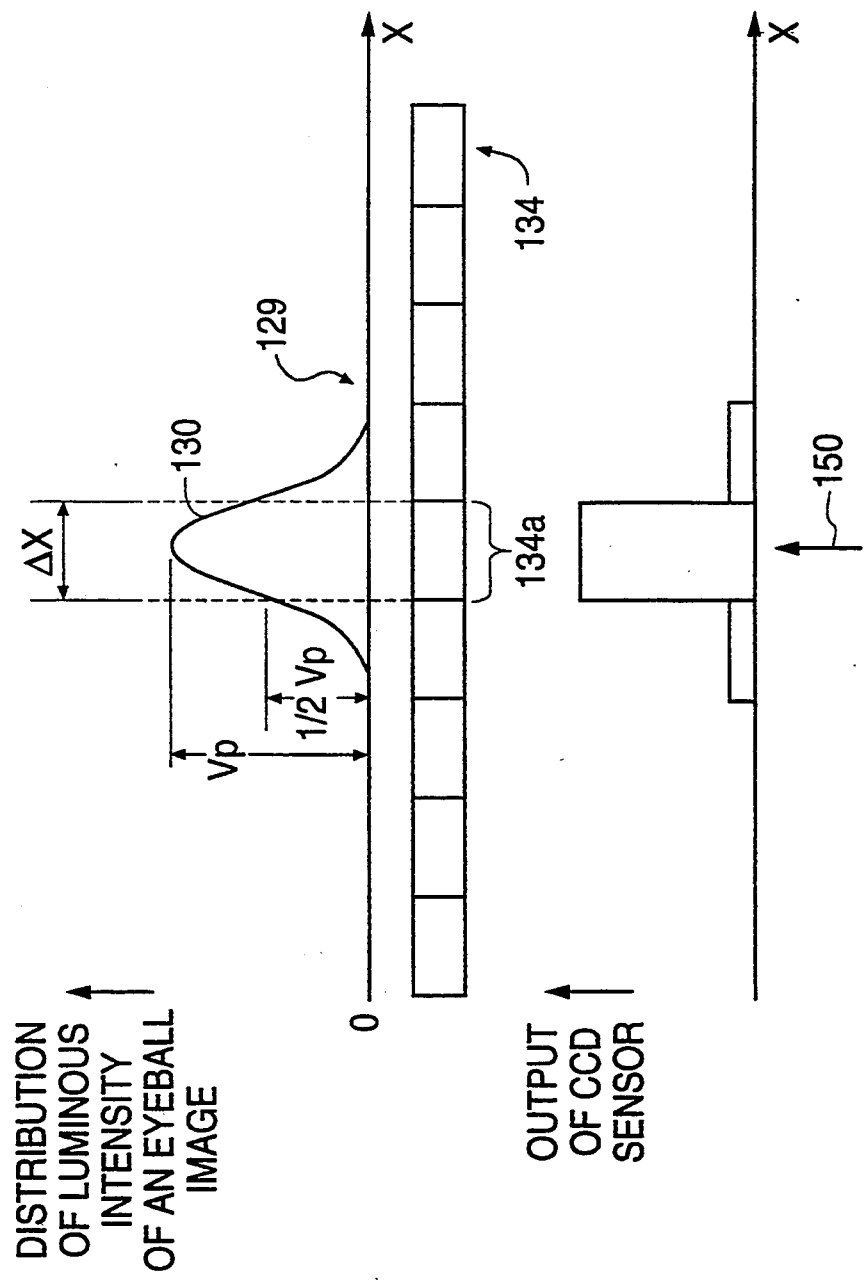
FIG. 14 is a characteristic diagram that shows a modified example of the visual line detecting device of the present invention.

In FIG. 4, Purkinje's first figure is smaller than a pixel of CCD line sensor 113. FIG. 14 illustrates a method for determining a more precise detection of a visual line based on light source size and pixel size, wherein arrow 150 represents the location of Purkinje's first figure. As shown in FIG. 14, if the correlation between the size of the light source and the size of a pixel is determined in such a way that half value width ($\Delta x$) of peak luminous intensity (Vp) for Purkinje's first figure is larger than the width of a pixel 134a of CCD line sensor 134, the location of the center of gravity is obtained from the output of the pixels that have detected the output of Purkinje's first figure, thereby achieving a more precise detection of the direction of the visual line.

Figure 5A:
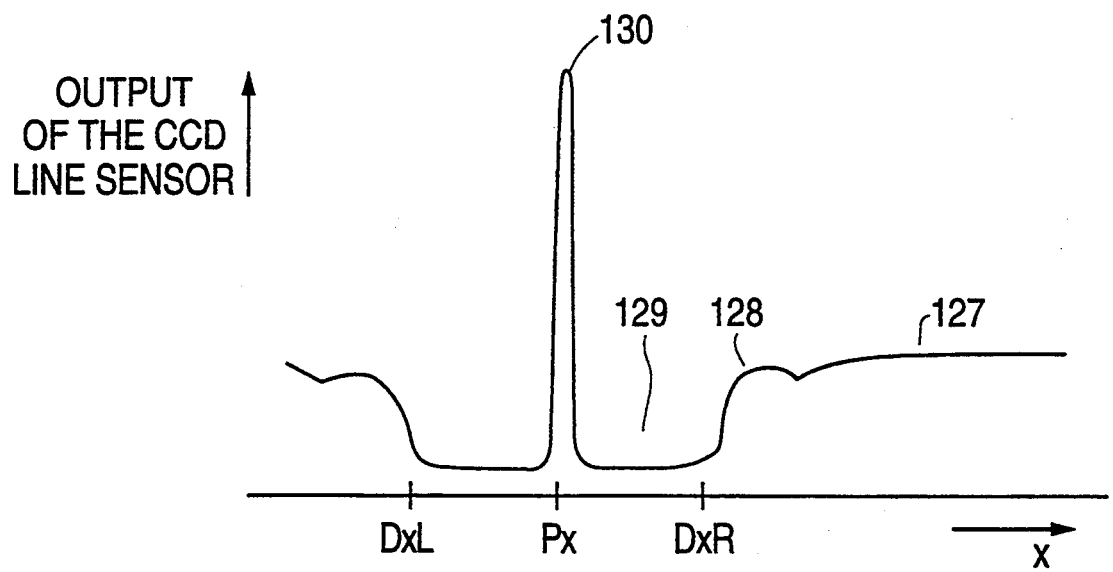
FIGS. 5(A) and 5(B) are characteristic diagrams that shows the state of detection in the first embodiment of the present invention.

FIGS. 5(A) and (B) show output examples of each element array 113a and 113b in both the horizontal and vertical directions, respectively, of CCD line sensor 113. In FIGS. 5(A) and (B), line 127 represents the output corresponding to sclera part 117 of eye 109, line 128 represents the output of iris part 118 of eye 109, and line 129 represents the output of pupil part 119 of eye 109. Notch 130 represents the output of Purkinje's first figure 120 formed by a luminous flux that has been irradiated from visual line detecting light source 110. Furthermore, in FIG. 5(B), line 131 represents the output due to the reflection from the skin area surrounding eye 109.

More specifically, FIG. 5(A) represents an output example of the element array 113a in the horizontal direction of CCD line sensor 113. Point Px on the horizontal axis is the detected location of Purkinje's first figure 120; DxL and DxR are the detected location of the boundary between iris part 118 and pupil part 119. Based on these three measured values, an eyeball's rotational angle "$\theta$" in the X-axis direction is obtained as follows:

$$\theta = \frac{1}{A-\rho} \left( \frac{DxL + DxR}{2} - Px \right) \times B \quad (1)$$

In the above-noted equation (1), A is the distance between the center of the pupil and the center of the eyeball's rotation, $\rho$ is the distance between the center of the cornea's curvature and the center of the eyeball's rotation, and B is the value which refers to the imaging magnification that is determined by the optical system. Although there are differences for A and $\rho$ between individuals, these differences do not differ substantially and can therefore be assumed as a constant. Therefore, the direction of the visual line is the direction wherein the discrepancy between the optical axis of the eyeball and the optic axis have been compensated for by the eyeball's rotational angle theta in the X-axis direction. As it is known that the discrepancy between the optical axis of the eyeball and the optic axis is in a range of approximately 5°~7°, estimates within these range may be applied.

Figure 5B:
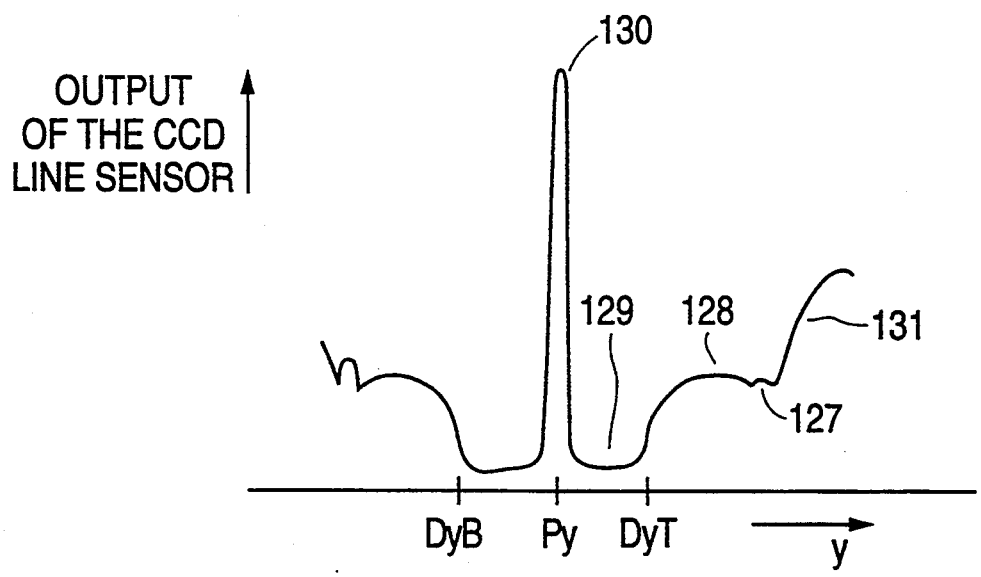

Similarly, FIG. 5(B) is an output example of element array 113b in the vertical direction of CCD line sensor 113. Point Py on the horizontal axis is the detected location of Purkinje's first figure 120; DyB and DyT are the detected location of the boundary between iris part 118 and pupil part 119. Based on these three measured values, the eyeball's rotational angle $\phi$ in the Y-axis direction is obtained as follows:

$$\phi = \frac{1}{A-\rho} \left( \frac{DyB + DyT}{2} - Py \right) \times B \quad (2)$$

Eyeball's rotational angle $\phi$ in the Y-axis direction that has been obtained is the direction of visual line in the Y-axis direction.

Moreover, even when eye 109 moves to the left in FIG. 4, thereby causing pupil part 119 to protrude from view finder field frame 115 or when DxL was not detected due to some other reasons, the location of the pupil center Dx may be obtained by using the equation for the quadratic curve of a circle as long as the boundary between iris part 118 and pupil part 119 on CCD line sensor 113 is detected at three other locations. Therefore, eyeball's rotational angle $\theta$ in the X-axis is obtained as follows:

$$\theta = \frac{1}{A-\rho} (Dx - Px) \times B \quad (3)$$

Consequently, for the direction of visual line in the X-axis, any discrepancy between the eyeball's optical axis and the optic axis may be compensated for.

Similarly, when one of the boundaries DxL, DxR, DyB, or DyT between iris part 118 and pupil part 119 of eye 109 was not detected due to some reason, the location of the pupil center (Dx, Dy) may be obtained by using the equation for the quadratic curve of a circle if the three other locations are detected. Therefore, the eyeball's rotational angle theta in the X-axis is obtained by using equation (3) and eyeball's rotational angle $\phi$ in the Y-axis direction is obtained as follows:

$$\phi = \frac{1}{A-\rho} (Dy - Py) \times B \quad (4)$$

Figure 6:
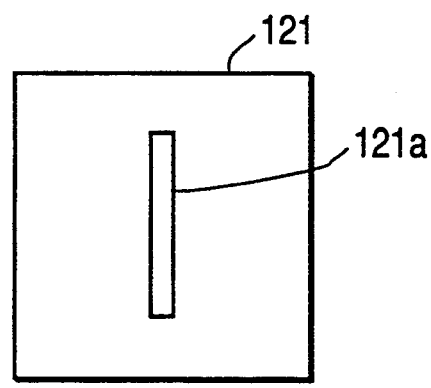
FIG. 6 is a front view that shows the shape of a mask in a modified example of the first embodiment of the present invention.

Furthermore, if it is not always required to obtain the eyeball's bi-directional rotational angle in X-axis and Y-axis. It is also possible to detect the eyeball's rotational angle in either direction of X-axis or Y-axis only by using mask 121 (as shown in FIG. 6) that has a bar-shaped opening 121a (see FIG. 6) and one CCD line sensor 122 (shown in FIG. 7) instead of using mask 111 (FIG. 2) that has cross-configured opening 111i (FIG. 2) and CCD line sensor 113 (see FIG. 3) arranged in a cross form.

Figure 7:
FIG. 7 is a front view that shows the shape of a light receiving element in a modified example of the first embodiment of the present invention.
Figure 8:
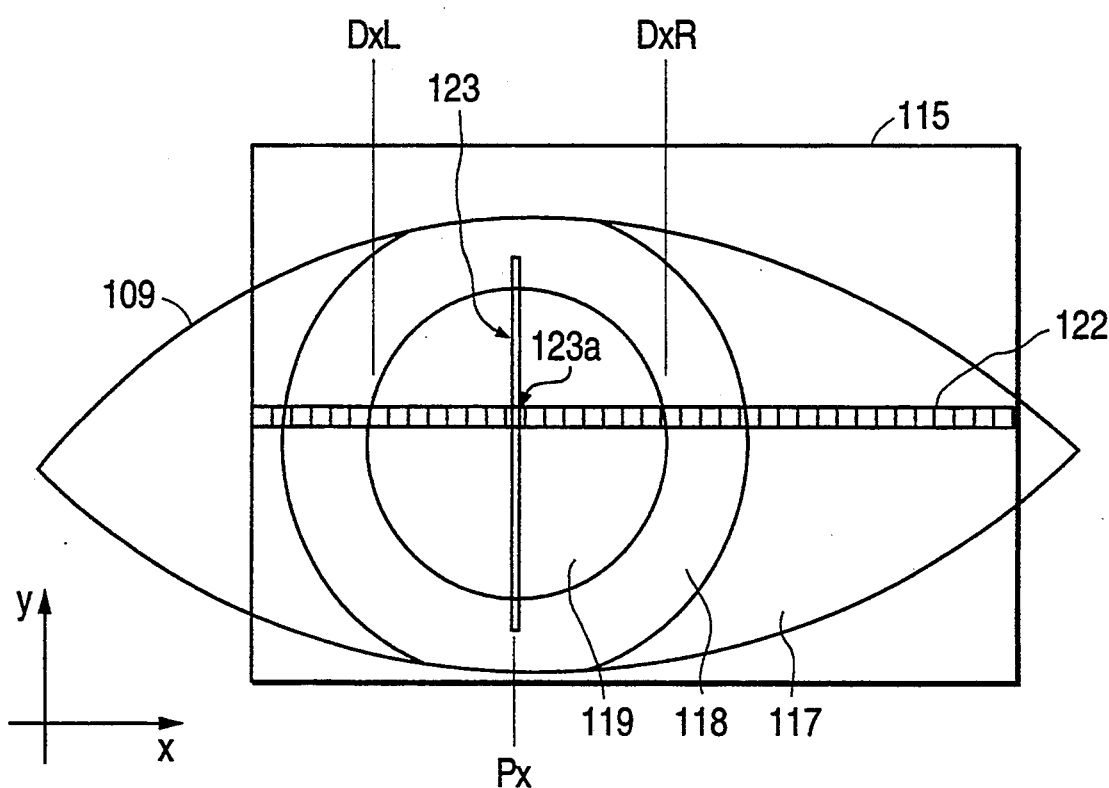
FIG. 8 is a front view that shows the state of detection in a modified example of the first embodiment of the present invention.

Referring now to FIG. 8, which illustrates the use of a bar-shaped Purkinje's first figure 123. The bar-shaped Purkinje's first figure 123 of FIG. 8 can be formed by mask 121 (see FIG. 6) having a bar-shaped opening 121a (see FIG. 6) and CCD line sensor 122 (see FIG. 7) arranged in the direction so that Purkinje's first figure 123 and CCD line sensor 122 intersect. The eyeball's rotational angle is obtained by substituting in equation (1) the boundaries DxL and DxR between iris part 118 and pupil part 119 and X-coordinate Px for point 123a where CCD line sensor 122 detects Purkinje's first figure 123. When detecting the Y-axis direction only, location of Purkinje's first figure 123 and CCD line sensor 122 are placed to detect the location Py of Purkinje's first figure 123 and the boundaries DyB and DyT between iris part 118 and pupil part 119, which are substituted in equation (2) to obtain the eyeball's rotational angle. Similar reference numerals in FIG. 8 and FIG. 4 represent similar elements or structures and explanation of these elements or structures are therefore abridged.

In FIG. 8, Purkinje's first figure 123 is smaller than a pixel of CCD line sensor 122. As shown in FIG. 14 where arrow 150 represents the location of Purkinje's first figure, a more precise direction of a visual line can be determined if the correlation between the size of the light source and the size of a pixel is stipulated in such way that half value width ($\Delta x$) of peak luminous intensity (Vp) for Purkinje's first figure is larger than the width of a pixel 134a of CCD line sensor 134. The location of the center of gravity is obtained from the output of a pixel that has detected the output of Purkinje's first figure, thereby achieving a more precise detection of the direction of the visual line.

Figure 9:
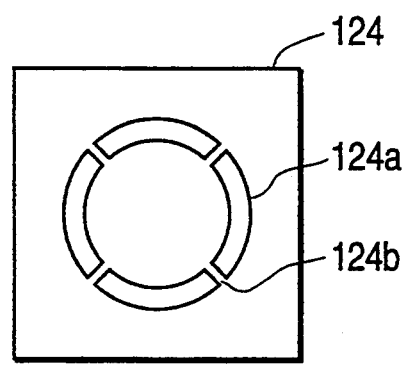
FIG. 9 is a front view that shows the shape of a mask in a second embodiment of the visual line detecting device of the present invention.

Next, a second embodiment of the visual line detecting device based on the present invention is explained. This second embodiment pertains to a camera equipped with a visual line detecting device that obtains the direction of visual line by using mask 124 (see FIG. 9) comprising a ring-shaped openings 124a (FIG. 9) and thin stanchions 124b (see FIG. 9) that support the internal light shielding members to form a ring. CCD line sensor 113 is arranged in a cross-configuration as shown in FIG. 3. Mask 124 is used in the configuration of FIG. 3 in place of mask 111.

Figure 10:
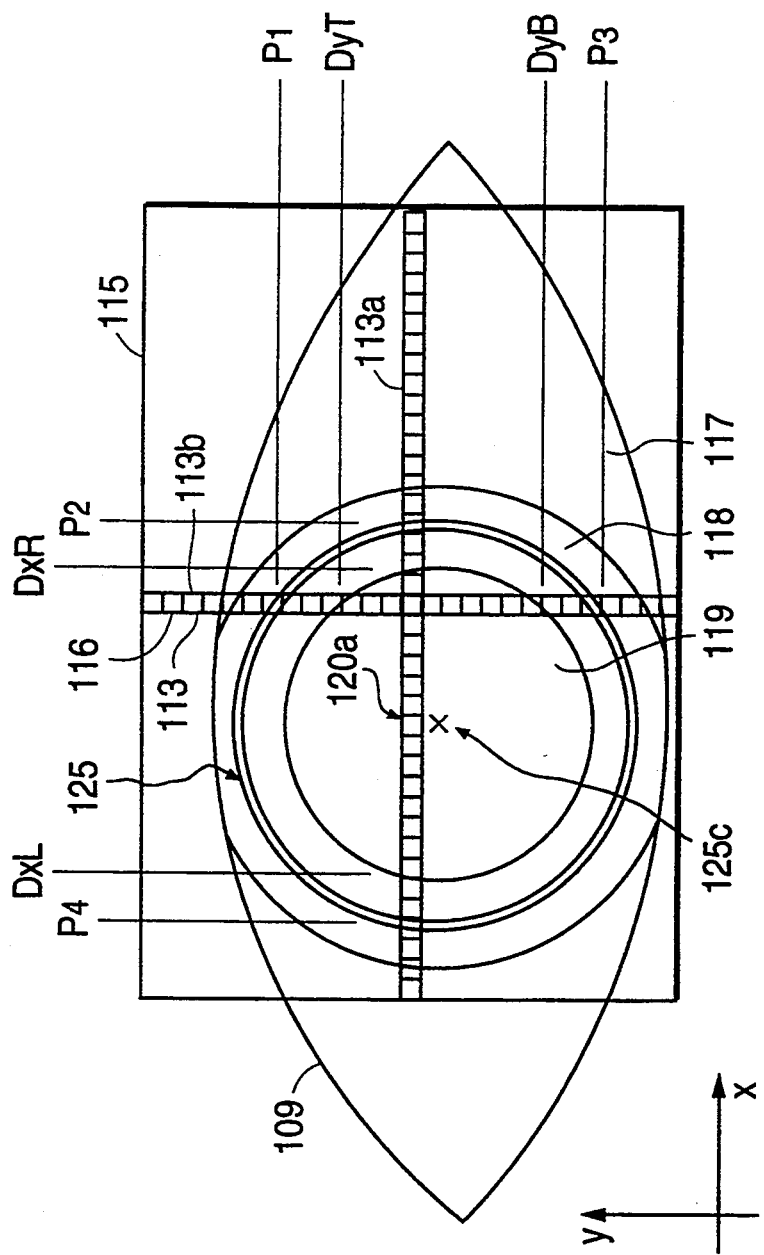
FIG. 10 is a front view that shows the state of detection in the second embodiment of the visual line detecting device of the present invention.

FIG. 10 illustrates the use of the present invention in a camera equipped with a visual line detecting device wherein the second embodiment has been applied, showing a front view, through the view finder of a camera, of the state of eye 109. In FIG. 10, the X-axis is also set in a horizontal direction and the Y-axis in the direction that intersects with the X-axis. Similar reference numerals in the second embodiment and the first embodiment represent similar elements or structures and explanation of these elements or structures are therefore abridged.

In FIG. 10, a ring-shaped Purkinje's first figure 125 is formed when mask 124 is used. The influences by stanchions 124b can be disregarded and are not shown in FIG. 10. Purkinje's first figure 125 is detected at four points of P1, P2, P3, and P4 by CCD line sensor 113 positioned in a cross configuration. Center points between P2 and P4, and P1 and P3, correspond with the X-coordinates and the Y-coordinates, respectively, for the center point 125c of ring-shaped Purkinje's first figure 125. Center point 125c of ring-shaped Purkinje's first figure 125 corresponds to the location of a dot-like Purkinje's first figure attributed to a point source positioned in the center of the ring-shaped opening on mask 124 (see FIG. 9). Consequently, the eyeball's rotational angle in the X-axis direction $\theta$ and the eyeball's rotational angle in the Y-axis direction $\phi$ are as shown below.

$$\theta = \frac{1}{A - \rho} \left( \frac{DxL + DxR}{2} - \frac{P2 + P4}{2} \right) \times B \quad (5)$$

$$\phi = \frac{1}{A - \rho} \left( \frac{DyB + DyT}{2} - \frac{P1 + P3}{2} \right) \times B \quad (6)$$

In the above-noted equation, A is the distance between the center of pupil and the center of eyeball's rotation, $\rho$ is the distance between the center of cornea's curvature and the center of eyeball's rotation, and B is the value which refers to the imaging magnification that is determined by the optical system of the device. Although there are differences for A and p by individuals, these differences do not differ substantially and they may be assumed as constant.

The direction of the visual line in the X-axis direction is the direction wherein the discrepancy between the optical axis of the eyeball and the optic axis have been compensated for by the eyeball's rotational angle $\theta$ in the X-axis direction while the direction of visual line in the Y-axis direction is the eyeball's rotational angle $\phi$ in the Y-axis direction. As it is known that the discrepancy between the optical axis of the eyeball and the optic axis is in the range of approximately 5°~7°, estimates within these range may be applied.

Figure 15:
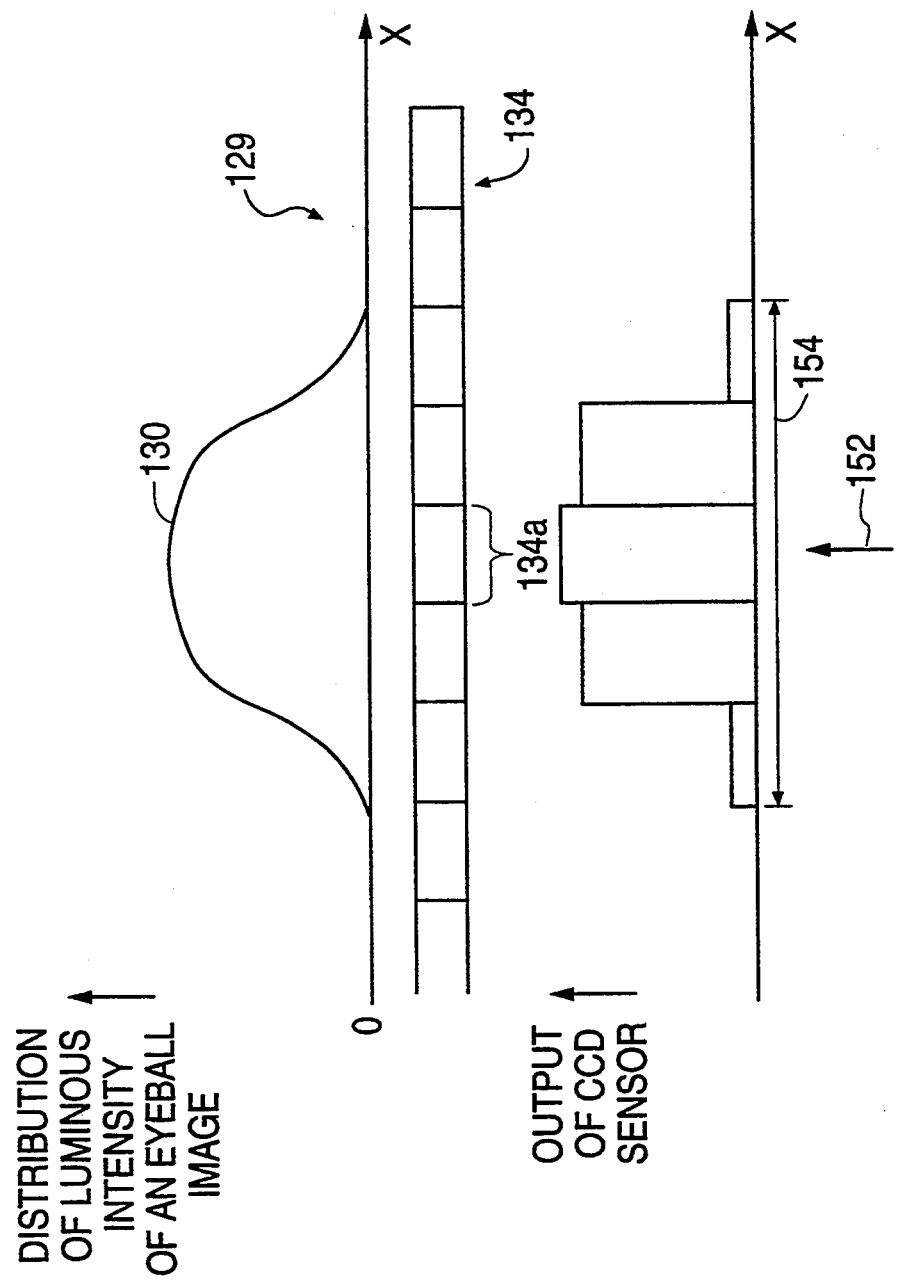
FIG. 15 is a characteristic diagram that shows a modified example of the visual line detecting device of the present invention.

In FIG. 10, Purkinje's first figure 125 is smaller than a pixel of CCD line sensor 113. As shown in FIG. 14 wherein arrow 150 represents the location of Purkinje's first figure, a more precise direction of a visual line can be determined if the correlation between the size of the light source and the size of a pixel is stipulated in such way that half value width ($\Delta x$) of peak luminous intensity (Vp) for Purkinje's first figure is larger than the width of a pixel 134a of CCD line sensor 134. The location of the center of gravity is obtained from the output of a pixel that has detected the output of Purkinje's first figure, thereby achieving a more precise detection of the direction of the visual line. Additionally, as shown in FIG. 15 where arrow 152 represents the location of Purkinje's first figure and line 154 represents a distance where the center of gravity is set, a ring-shaped Purkinje's first figure may be detected across in a plural of pixels of CCD line sensor 134, depending upon the location of the eyeball. Even in this case, the direction of the visual line may be detected more precisely by obtaining the location of the center of gravity from the output of the pixels that have detected the output of Purkinje's first figure.

Moreover, in FIG. 10, center point 125c of ring-shaped Purkinje's first figure 125 may be obtained from the equation for the quadratic curve of a circle as long as three points of P1 through P4 are detected. For example, in FIG. 10, the visual line may be detected even if eye 109 moves further to the left, thereby causing ring-shaped Purkinje's first figure 125 to protrude from view finder field frame 115.

Similarly with the location of the pupil center, if the boundaries between iris part 118 and pupil part 119 are detected at three locations on CCD line sensor 113, location of the pupil center may be obtained.

Furthermore, in this embodiment, when the eyeball's rotational angle needs to be detected in either the X-axis or Y-axis direction only, the direction of the visual line may be also detected by using one CCD line sensor 122 as shown in FIG. 7.

FIG. 16 is a side view of a third embodiment for the visual line detecting device using the present invention wherein this embodiment is suitable for uses other than cameras.

In FIG. 16, an imaginary observation plane 201 is placed in the direction of a subject (not illustrated) observed by a viewer (not illustrated). This embodiment uses an optical division device 215 such as a dichroic mirror that reflects an infrared light range and allows a visible light range to penetrate. A viewer observes the subject on the aforementioned observation plane 201 through viewer's eye 109. Eye 109 is irradiated with light from a visual line detecting light source 210. Preferably, visual line detecting light source 210 emits light in an invisible wavelength range by using an infrared emitting diode. Mask 211 is used to form a luminous flux in a desired shape. In this embodiment, mask 211 has a cross-shaped opening (as shown for mask 111 in FIG. 2). Half mirror 212 is positioned for the purpose of guiding the image of eye 109 to form on photoelectric conversion element 213, wherein eye 109 is lighted by visual line detecting light source 210. Photoelectric conversion element 213 includes two CCD line sensors (not illustrated in FIG. 16) which are positioned so that they intersect at right angles to form a cross-configuration (as shown for CCD line sensor 113 in FIG. 3). Lens 214 is comprised of one lens or multiple of lenses to form an optical system for illuminating eye 109 with luminous flux emitted from visual line detecting light source 210 positioned at a sufficiently distant point. Lens 214 also functions as an image forming lens that forms the image on CCD line sensor 213. A focal point when the cornea surface of eye 109 is regarded as a lens, mask 211 and CCD line sensor 213 are located in roughly conjugated positions.

FIG. 4 is a diagram that shows the state of eye 109 when viewed from observation plane 201 in a visual line detecting device of FIG. 16. The X-axis is set along the horizontal direction and the Y-axis is set perpendicular to said X-axis. The X-axis and Y-axis correspond to the actual horizontal and vertical directions. Range 116 indicates the range that is actually measured by CCD line sensor 113 placed in a cross configuration. CCD line sensor 113 has element arrays 113a and 113b placed in a cross configuration corresponding to the direction of both the X-axis and Y-axis, respectively. Eye 109 is further illustrated as having sclera part 117, iris part 118 and pupil part 119. Purkinje's first figure 120 represents a virtual image of reflected light that is reflected onto the cornea surface of eye 109 when eye 109 is irradiated by visual line detecting light source 210.

As previously described, the direction of visual lines in the X-axis and the Y-axis directions may be detected with a simple combination of two CCD line sensors in a cross configuration by providing the luminous flux of visual line detecting light source 110 with a cross or ring-configuration. The configuration of luminous flux of visual line detecting light source 110 may be a cross, ring, rectangle, linear, or other shapes. Additionally, the number of CCD line sensors are not limited to two; multiple cross or parallel cross are also acceptable when more than three CCD line sensors are used. Furthermore, the direction of the visual line may be detected when more than two CCD line sensors intersect at optional angles rather than intersecting at right angles.

Figure 11:
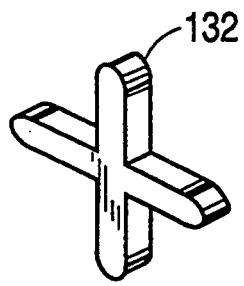
FIG. 11 is a perspective view that shows a modified example of a luminous source.

In the above-noted embodiments, a mask (such as mask 111 or mask 124) was used to provide a pattern for a luminous flux of visual line detecting light source 110; however, the configuration of a light source may retain a pattern, as shown in FIG. 11. In FIG. 11, visual line detecting light source 132 retains a cross configuration.

Figure 12:
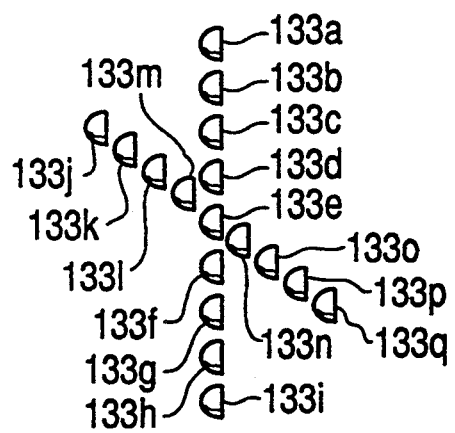
FIG. 12 is a perspective view that shows a modified example of a luminous source.
Figure 13:
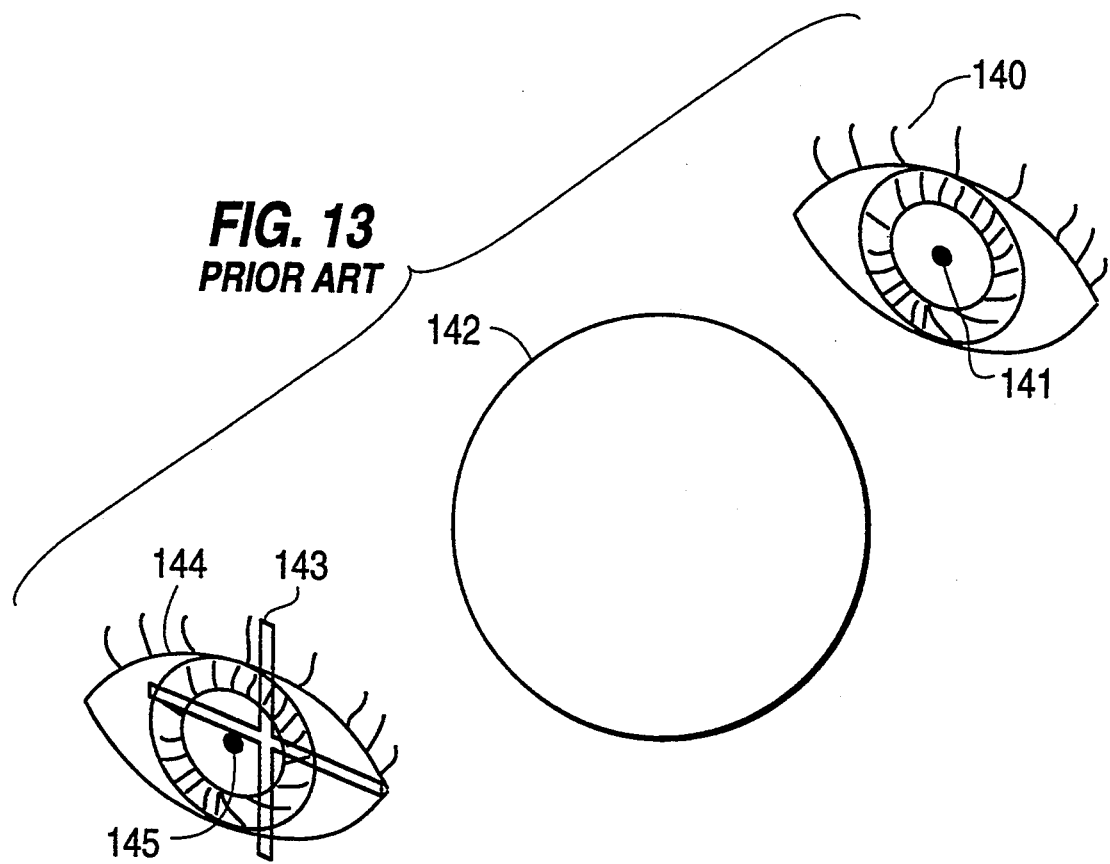
FIG. 13 (PRIOR ART) is a perspective view that shows an example of a conventional visual line detecting device.

Moreover, a multiple number of dot-like light sources may be arranged to form a specified pattern, as shown in FIG. 12. In FIG. 12, seventeen dot-like visual line detecting light sources, 133a–133q, are used to form a cross.

Additionally, a light source may be connected to one end of a glass fiber bundle to form a specified pattern with the other end.

Similarly, as with a cross configuration, when a ring-shape light source is used, the light source itself may retain a pattern, or a multiple number of dot-like light sources may be used to form a ring shape.

In addition, optical systems such as cylindrical lens systems, etc. may be used to achieve a bar shape.

Furthermore, in the above-noted embodiments, instances wherein two orthogonal first dimensional photographic elements (CCD line sensors) used as light detecting elements were described. However, the invention is not limited to the two orthogonal first dimensional photographic elements and it is also possible to use second dimensional photographic elements. When two of the orthogonal first dimensional photographic elements are used, it is possible to increase the processing speed and reduce cost.

As described above, according to the visual line detecting device of the present invention, eyeball irradiating light reflecting on the cornea surface forms a reflected image having a specified shape rather than a dot image, thereby enabling the detection of the visual line rapidly and accurately.

The visual line detecting device according to the present invention is equipped with eyeball lighting means for lighting the viewer's eyeball, as well as visual line detection means for detecting the visual line of a viewer from the reflected image on the cornea surface that is obtained by irradiating the luminous flux, emitted from the eyeball lighting means, onto the viewer's eyeball. The eyeball lighting means has a specified configuration so that the reflected image on the cornea surface (formed when the eyeball lighting means lights the viewer's eyeball) forms a specified shape.

Moreover, a visual line detecting device in the above described second embodiment is equipped with eyeball lighting means for lighting the viewer's eyeball, luminous flux forming means for forming a luminous flux by either shielding or penetrating the light emitted by the eyeball lighting means, and visual line detecting means for detecting the visual line of a viewer from a reflected image on the cornea surface obtained by irradiating the luminous flux, formed by the luminous flux forming means, onto the viewer's eyeball. The luminous flux forming means forms a luminous flux with a specified cross-sectional surface so that the reflected image on the cornea surface attains a specified shape.

In a visual line detecting device of the present invention, it is possible to execute visual line detection rapidly and accurately by having a reflected image on the cornea surface to form a specified shape, rather than a dot image, and detecting the images with the use of two orthogonal first dimension photographic elements.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A visual line detecting device, comprising:
   eyeball lighting unit that lights an eyeball of a viewer with a luminous flux to produce a specific, non-dot shape image reflected on the cornea surface of the eyeball;
   image detecting unit that detects the image; and
   visual line detection unit that determines the visual line of a viewer from the image detected by said image detecting unit.

2. A visual line detecting device described in claim 1, wherein said eyeball lighting unit produces an image having a cross shape, a circular ring shape, a rectangular shape or a linear bar shape.

3. A visual line detecting device as in claim 1, wherein said eyeball lighting unit lights the eyeball with a luminous flux formed by shielding, penetrating or emitting light.

4. A visual line detecting device as in claim 2, wherein said eyeball lighting unit lights the eyeball with a luminous flux formed by shielding, penetrating or emitting light.

5. A visual line detecting device as in claim 1, wherein said image detecting unit utilizes only one light receiving element.

6. A visual line detecting device as in claim 1, wherein said image detecting unit utilizes a CCD sensor having only one element array.

7. A visual line detecting device as in claim 6, wherein said eyeball lighting unit produces an image having a linear bar shape which is perpendicular to the element array of said CCD sensor.

8. A visual line detecting device as in claim 1, wherein said image detecting unit utilizes a CCD sensor having two element arrays placed in a configuration perpendicular to each other to form a cross shape.

9. A visual line detecting device as in claim 2, wherein said image detecting unit utilizes only one light receiving element.

10. A visual line detecting device as in claim 2, wherein said image detecting unit utilizes a CCD sensor having only one element array.

11. A visual line detecting device as in claim 2, wherein said image detecting unit utilizes a CCD sensor having two element arrays placed in a configuration perpendicular to each other to form a cross shape.

12. A visual line detecting device as in claim 1, wherein said image detecting unit comprises a CCD line sensor having a pixel size determined so that half value width of peak luminous intensity of Purkinje's first figure is larger than the width of a pixel.

13. A visual line detecting device as in claim 2, wherein said image detecting unit comprises a CCD line sensor having a pixel size determined so that half value width of peak luminous intensity of Purkinje's first figure is larger than the width of a pixel.

14. A visual line detecting device as in claim 1, wherein said eyeball lighting unit comprises a mask for forming a luminous flux.

15. A visual line detecting device as in claim 14, wherein said mask forms a linear bar-shaped luminous flux.

16. A visual line detecting device as in claim 14, wherein said mask forms a circular ring shape luminous flux having thin stanchions.

17. A visual line detecting device as in claim 14, wherein said mask forms a rectangular shape having thin stanchions.

18. A visual line detecting device as in claim 14, wherein said mask forms a cross-shaped luminous flux.

19. A visual line detecting device, comprising:
   means for lighting an eyeball with a luminous flux to produce an image reflected on the cornea surface of the eyeball, wherein the image has a specific, non-dot, shape;
   means for detecting the image; and
   means for determining the visual line of a viewer based on the image detected by said detecting means.

20. A visual line detecting device described in claim 19, wherein said lighting means produces an image having a cross shape, a circular ring shape, a rectangular shape or a linear bar shape.

21. A visual line detecting device as in claim 19, wherein said lighting means lights the eyeball with a luminous flux formed by shielding, penetrating or emitting light.

22. A visual line detecting device described in claim 21, wherein said lighting means produces a reflected image having a cross shape, a circular ring shape, a rectangular shape or a linear bar shape.

23. A visual line detecting device as in claim 19, wherein said detecting means comprises a CCD line sensor having a pixel size determined so that half value width of peak luminous intensity of Purkinje's first figure is larger than the width of a pixel.

* * * * *